United States Patent
Tomita

(10) Patent No.: US 11,983,303 B2
(45) Date of Patent: May 14, 2024

(54) INTRINSIC DATA GENERATION DEVICE, SEMICONDUCTOR DEVICE AND AUTHENTICATION SYSTEM

(71) Applicant: Winbond Electronics Corp., Taichung (TW)

(72) Inventor: Yasuhiro Tomita, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 1230 days.

(21) Appl. No.: 16/392,648

(22) Filed: Apr. 24, 2019

(65) Prior Publication Data

US 2019/0347447 A1 Nov. 14, 2019

(30) Foreign Application Priority Data

May 10, 2018 (JP) .................................. 2018-091190

(51) Int. Cl.
*H04L 29/06* (2006.01)
*G06F 1/10* (2006.01)
*G06F 21/75* (2013.01)
*H01L 23/00* (2006.01)

(52) U.S. Cl.
CPC .............. *G06F 21/75* (2013.01); *G06F 1/10* (2013.01); *H01L 23/576* (2013.01)

(58) Field of Classification Search
CPC ........... G06F 21/75; G06F 1/10; H01L 23/576
See application file for complete search history.

(56) References Cited

U.S. PATENT DOCUMENTS

| 8,782,396 | B2 | 7/2014 | Ziola et al. | |
| 9,634,878 | B1* | 4/2017 | Bench | H04L 27/3455 |
| 2016/0093393 | A1* | 3/2016 | Park | G11C 16/10 |
| | | | | 380/28 |

FOREIGN PATENT DOCUMENTS

| CN | 107276761 | 10/2017 |
| JP | 2005044090 | 2/2005 |
| JP | 2005523481 | 8/2005 |
| JP | 2006215824 | 8/2006 |
| JP | 2017183944 | 10/2017 |
| JP | 2018050103 | 3/2018 |
| KR | 20040102110 | 12/2004 |

(Continued)

OTHER PUBLICATIONS

"Office Action of Korea Counterpart Application" with English translation thereof, issued on Feb. 26, 2021, p. 1-p. 12.

(Continued)

*Primary Examiner* — Wasika Nipa
(74) *Attorney, Agent, or Firm* — JCIPRNET

(57) ABSTRACT

The intrinsic data generation device of the disclosure includes a modulation control part outputting a modulation control signal for controlling modulation, a modulation part modulating a signal based on the modulation control signal and outputting a modulated modulation signal, a PUF circuit specifying a relationship between input data and output data based on random variation intrinsic to the device and changing the output data based on the modulation signal, a data holding part holding the output data from the PUF circuit in response to the modulation control signal, and an intrinsic data output part outputting intrinsic data based on the output data provided from the data holding part.

9 Claims, 6 Drawing Sheets

(56) References Cited

FOREIGN PATENT DOCUMENTS

| | | |
|---|---|---|
| KR | 20150026737 | 3/2015 |
| KR | 20180031568 | 3/2018 |
| TW | 200943897 | 10/2009 |

OTHER PUBLICATIONS

"Office Action of Korea Counterpart Application" with English translation thereof, issued on Aug. 26, 2020, p. 1-p. 13.
Y. Gao et al., "Emerging Physical Unclonable Functions With Nanotechnology," Journal of Power Sources, vol. 4, Feb. 28, 2016, pp. 61-80.
C. Herder et al., "Physical Unclonable Functions and Applications: A Tutorial," Proceedings of the IEEE, vol. 102, No. 8, Aug. 2014, pp. 1126-1141.

* cited by examiner

INTRINSIC DATA GENERATION DEVICE, SEMICONDUCTOR DEVICE AND AUTHENTICATION SYSTEM

CROSS-REFERENCE TO RELATED APPLICATION

This application claims the priority benefit of Japan application serial no. 2018-091190, filed on May 10, 2018. The entirety of the above-mentioned patent application is hereby incorporated by reference herein and made a part of this specification.

BACKGROUND

Technical Field

The disclosure relates to an intrinsic data generation device for generating intrinsic data in a semiconductor device.

Description of Related Art

In recent years, as the security of electronic devices and electronic apparatuses strengthens, there is demand for countermeasures against counterfeiting and imitation of semiconductor devices mounted thereon. In one method, the semiconductor device has been given intrinsic information, and if the intrinsic information is authenticated, the semiconductor device will be regarded authentic and the semiconductor device or electronic equipment will be allowed to operate. Recently, PUF (Physical Unclonable Function), which makes it impossible to physically create a clone as intrinsic information, has been drawing a lot of attention. PUF uses unpredictable, highly confidential and permanent physical information as intrinsic information.

PUF is increasingly used not only for generation of encryption keys but also for applications of security, authentication, etc. For PUF, an important feature is to guarantee the reliability of small random variations in the manufactured devices to generate trusted random keys. Most PUF designs focus on utilizing process variations such as the propagation delay time, internal current or voltage. PUF specifies the relationship between input and output (that is, it is called a challenge-response pair (CRP)) based on random variables such as fingerprints that are intrinsic to the devices (for example, U.S. Pat. No. 8,782,396; "Physical Unclonable Functions and Applications: A Tutorial", Charles Herder, Meng-Day Yu, Farinaz Koushanfer, Srinivas Devadas, Proceedings of the IEEE Vol. 102, No. 8, P 1126-1141, August 2014; and "Emerging Physical Unclonable Functions with Nanotechnology", Yansong Cao, et. al., IEEE Access, Volume 4, P 51-80, Feb. 28, 2016).

If the random variations are very small relatively, the relationship between input and output of PUF can be very sensitive to environmental conditions such as the power source voltage level, device operating temperature, etc. Therefore, the conventional PUF technology needs to utilize more CRPs for highly integrated circuits and needs to have complicated processing functions in order to extract features of the random variations.

SUMMARY

In view of the above, the disclosure provides an intrinsic data generation device that can provide stable and highly reliable intrinsic data with cost-effective circuits.

An intrinsic data generation device of the disclosure includes: a modulation part modulating a signal based on a modulation control signal that is for controlling modulation, and outputting a modulation signal that has been modulated; a PUF part specifying a relationship between input data and output data based on a random variation intrinsic to a device and changing the output data based on the modulation signal; and an intrinsic data output part generating intrinsic data based on the output data outputted from the PUF part and outputting the intrinsic data that has been generated.

In an embodiment, the modulation part modulates a voltage level based on the modulation control signal, and the PUF part changes the output data in response to modulation of the voltage level. In an embodiment, the modulation part modulates the voltage level in m stages (m is an integer equal to or greater than 2), the PUF part outputs m pieces of output data in response to modulation of the voltage level in m stages, and the intrinsic data output part converts the m pieces of output data into a piece of intrinsic data based on a predetermined logic. In an embodiment, the intrinsic data generation device further includes a modulation control part generating the modulation control signal, wherein the input data has a data pattern associated with a data pattern of the modulation control signal. In an embodiment, the data pattern is a clock signal. In an embodiment, the intrinsic data generation device further includes a holding part holding the output data outputted from the PUF part in response to the modulation control signal, wherein the holding part provides one or more pieces of output data to the intrinsic data output part. In an embodiment, the PUF part includes an input bus inputting a plurality of pieces of input data and an output bus outputting a plurality of pieces of output data, and the intrinsic data output part generates the intrinsic data based on the plurality of pieces of output data outputted from the output bus. In an embodiment, the modulation part modulates a current level based on the modulation control signal, and the PUF part changes the output data in response to modulation of the current level. In an embodiment, the modulation part modulates trimming data based on the modulation control signal, and the PUF part changes the output data in response to modulation of the trimming data.

A semiconductor device according to the disclosure includes: an intrinsic data generation device having the aforementioned configuration; a circuit performing a specific function; and an external terminal at least connected to the intrinsic data generation device respectively, wherein the external terminal outputs the intrinsic data to outside.

An authentication system according to the disclosure includes: a semiconductor device having the aforementioned configuration; and a host device connected to the semiconductor device, wherein the host device authenticates the semiconductor device based on the intrinsic data outputted from the semiconductor device.

According to the disclosure, since the PUF part changes the output data based on the modulation signal, it is possible to provide output data that is not easily affected by the environmental conditions, and as a result, the stability and reliability of the intrinsic data can be improved. Furthermore, the configuration for changing the output data based on the modulation signal is simple and can achieve cost reduction.

DESCRIPTION OF THE EMBODIMENTS

Hereinafter, embodiments of the disclosure will be described in detail with reference to the drawings. An intrinsic data generation device of the disclosure generates intrinsic data that is intrinsic to devices such as a semiconductor device. The intrinsic data generation device of the disclosure is mounted on a semiconductor device or an electronic device and is used for the authentication system or security system of these devices. In addition to the intrinsic data generation device, the semiconductor device according to the disclosure may include a circuit for performing any particular function. The semiconductor device may be, for example, a semiconductor memory, a semiconductor logic, a semiconductor processing circuit, a semiconductor driving circuit, a central processing circuit, etc. Moreover, the semiconductor device can be used in an IC card medium (for example, a SIMM card, a credit card, or a card with built-in IC), a mobile terminal such as a smartphone, or any electronic device that requires authentication and security such as electronic equipment, computers, etc.

Embodiments

Figure 1:
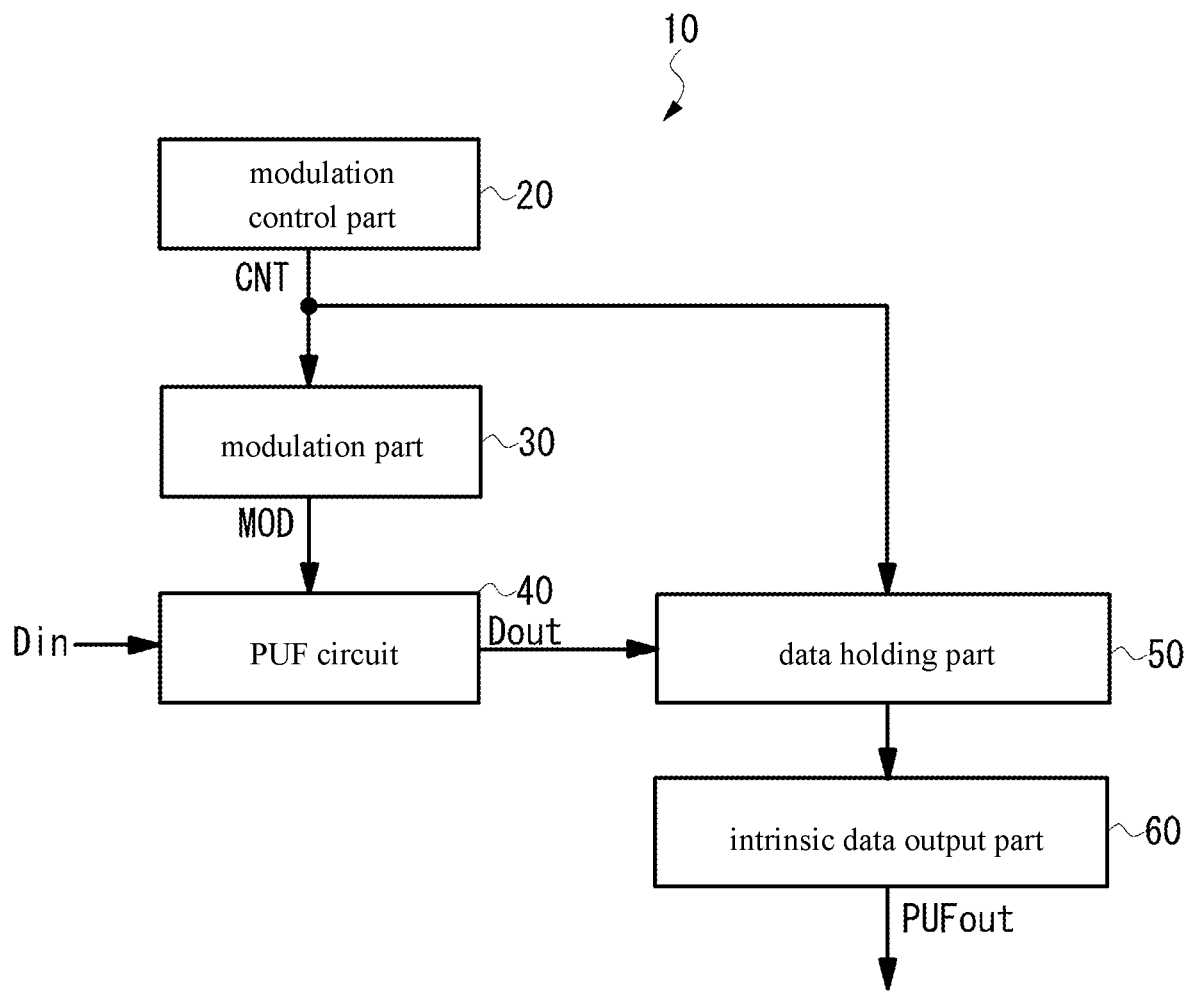
FIG. 1 is a block diagram showing the internal configuration of the intrinsic data generation device according to an embodiment of the disclosure.

FIG. 1 is a block diagram showing an internal configuration of the intrinsic data generation device according to an embodiment of the disclosure. The intrinsic data generation device 10 according to the present embodiment includes a modulation control part 20, a modulation part 30, a PUF circuit 40, a data holding part 50, and an intrinsic data output part 60.

The modulation control part 20 outputs a modulation control signal CNT for controlling modulation. The modulation part 30 modulates a signal based on the modulation control signal CNT and outputs a modulated modulation signal MOD. The PUF circuit 40 specifies an intrinsic relationship with randomness between input and output and modulates or changes the output in the intrinsic relationship with randomness by the modulation signal MOD. The data holding part 50 holds output data Dout from the PUF circuit 40 in response to the modulation control signal CNT. The intrinsic data output part 60 outputs intrinsic data PUFout based on the output data Dout held in the data holding part 50.

The modulation control part 20 outputs the modulation control signal CNT for controlling modulation of the modulation part 30 to the modulation part 30. The modulation control signal CNT is not particularly limited and may be, for example, a signal specifying a modulation pattern or a modulation sequence, a clock signal, or a pulse signal.

The modulation part 30 outputs the modulation signal MOD based on the modulation control signal CNT. The modulation signal MOD is, for example, a signal obtained by modulating the voltage level, the current level, the trimming data for trimming the circuit, or the like. For example, if the modulation control signal CNT is a clock signal, the modulation part 30 outputs a signal obtained by modulating the voltage level to the PUF circuit 40 in response to the rising edge or the falling edge of the clock signal.

The PUF circuit 40 specifies a relationship with randomness, intrinsic to the device, between the input data Din and the output data Dout. The PUF circuit 40 outputs intrinsic output data Dout for the input data Din, for example, by utilizing process variations such as the current, voltage, and propagation delay time of the circuit elements or circuits.

The input data Din to be inputted to the PUF circuit 40 is data associated or tagged with the modulation control signal CNT. For example, the input data Din has a data pattern or signal similar to the modulation control signal CNT. Furthermore, the PUF circuit 40 of the present embodiment modulates or changes the output data Dout by the modulation signal MOD outputted from the modulation part 30. In other words, even with the same input data Din, the output data Dout changes in accordance with the modulation signal MOD.

The data holding part 50 holds the output data Dout outputted from the PUF circuit 40 in response to the modulation control signal CNT. The number of pieces of the output data Dout held by the data holding part 50 is arbitrary and is one or more. The data holding part 50 outputs the held output data Dout to the intrinsic data output part 60.

The intrinsic data output part 60 generates the intrinsic data PUFout based on one or more pieces of the output data Dout and outputs it to the outside. The intrinsic data output part 60 converts one or more pieces of the output data Dout from the outside into the intrinsic data PUFout by using a predetermined logic function such as weighted majority logic, probability function, a match circuit such as EXOR or EXNOR, an anti-match circuit or the like. Moreover, in an embodiment, in order to compensate for the reproducibility of the output data Dout generated by the PUF circuit 40, the intrinsic data output part 60 may mask a part of unstable PUFout by internal calculation using external data or its own internal calculation.

Since the intrinsic data generation device 10 of the present embodiment changes the output of the PUF circuit 40 based on the modulation signal MOD, it is possible to generate stable and highly reliable intrinsic data that is not easily affected by environmental conditions such as the power source voltage and operating temperature.

Figure 2:
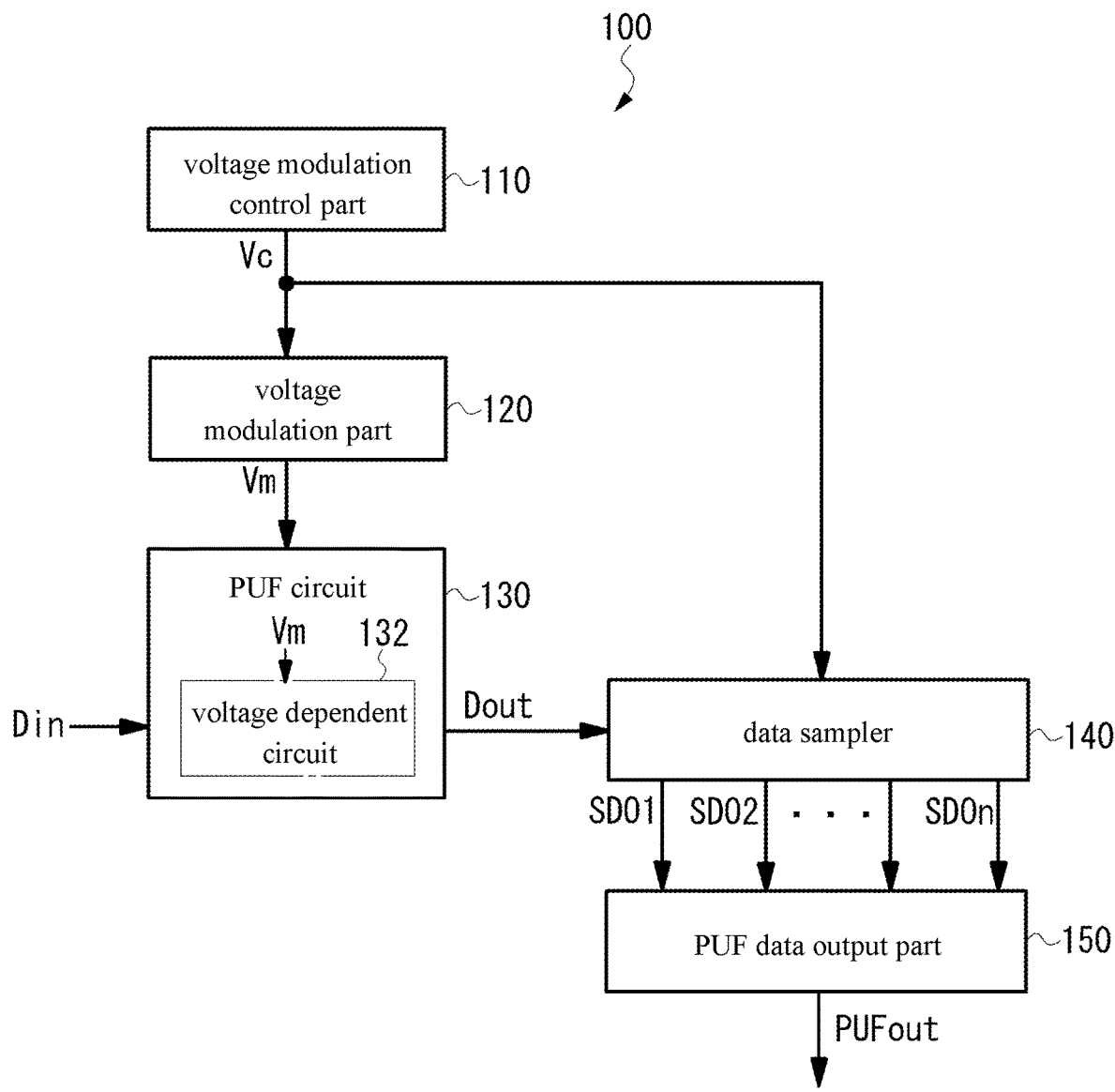
FIG. 2 is a block diagram showing the internal configuration of the PUF generation device according to an embodiment of the disclosure.

Next, a specific configuration of the intrinsic data generation device of the present embodiment will be described. FIG. 2 is a block diagram showing the internal configuration of a PUF generation device of the present embodiment. As shown in the figure, the PUF generation device 100 includes a voltage modulation control part 110, a voltage modulation part 120, a PUF circuit 130, a data sampler 140, and a PUF data output part 150.

The voltage modulation control part 110 outputs a voltage modulation control signal Vc for modulating the voltage to the voltage modulation part 120. The voltage modulation control signal Vc is a signal indicating a sequential pattern for specifying the voltage modulation, and this sequential pattern is tagged (associated) with the pattern of the input data Din of the PUF circuit 130. The voltage modulation control signal Vc may be, for example, a clock signal having a constant frequency. The voltage modulation part 120 receives the voltage modulation control signal Vc, modulates the voltage level in response to the voltage modulation control signal Vc, and outputs a modulation signal Vm obtained by modulating the voltage level to the PUF circuit 130.

The PUF circuit 130 receives the modulation signal Vm and changes or modulates the intrinsic output data Dout for the input data Din in accordance with the modulation signal Vm. The input data Din may have, for example, the same data pattern as the delayed voltage modulation signal Vc. During the period in which the output data Dout is outputted by the PUF circuit 130, the voltage level supplied to the PUF circuit 130 changes dynamically.

Figure 3:
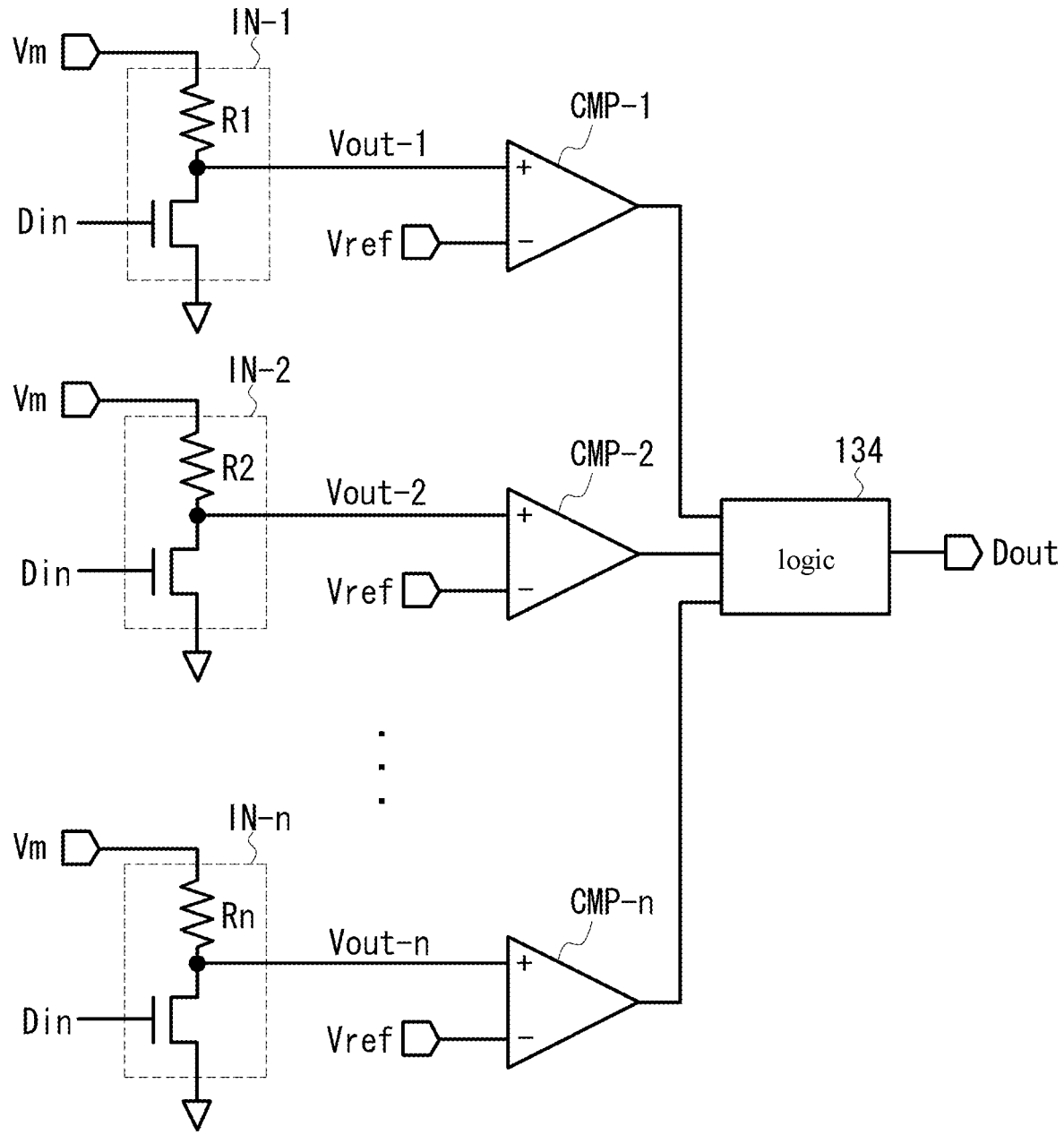
FIG. 3 is a diagram showing an example of the PUF circuit according to the present embodiment.

The PUF circuit 130 includes a voltage dependent circuit 132 that the relationship, with randomness intrinsic to the device, between input and output depends on the voltage. The modulation signal Vm is supplied as the operating voltage of the voltage dependent circuit 132, and the voltage dependent circuit 132 outputs the output data Dout corresponding to the modulation signal Vm. The configuration of the voltage dependent circuit 132 is not particularly limited and an example thereof is shown in FIG. 3. As shown in the figure, the voltage dependent circuit 132 includes a plurality of inverters IN-1, IN-2 . . . IN-n, a plurality of comparators CMP-1, CMP-2 . . . CMP-n, and a logic 134 (the inverters, comparators, etc. may be collectively referred to as inverters IN, comparators CMP, etc. hereinafter).

The inverter IN is formed, for example, by connecting a pull-up resistor and a NMOS transistor in series, the modulation signal Vm is supplied to the operating voltage of the inverter IN, and the input data Din associated with the voltage modulation control signal Vc is applied to the gate of the transistor. An output voltage Vout of the inverter IN is supplied to one input of the comparator CMP and a reference voltage Vref is supplied to the other input thereof. The comparator CMP compares the output voltage Vout with the reference voltage Vref and outputs the comparison result as the output data Dout.

Resistors R1, R2 . . . Rn having different resistance values are connected to the inverters IN-1, IN-2 . . . IN-n respectively, and different voltages are generated for the output voltages Vout-1, Vout-2 . . . Vout-n respectively. The logic 134 receives the comparison results of the comparators CMP-1, CMP-2 . . . CMP-n and outputs the output data Dout based on a predetermined logic circuit. Characteristics of the resistors, transistors, wirings, etc. that form the inverters IN differ due to process variations between the chips or between the devices. Therefore, the output voltages Vout-1, Vout-2 . . . Vout-n differ between the devices. In other words, the comparison results of the comparators CMP-1, CMP-2 . . . CMP-n differ between the devices, and hence the output data Dout of the logic 134 can serve as device-intrinsic data.

The process variations can be information intrinsic to the device, but the variations are very small and sensitive to the environmental conditions such as power source voltage, operating temperature, etc. In other words, in order to identify slight variations without being influenced by the environmental conditions, a high-precision circuit is required. If the output voltage Vout of the inverter IN changes by a variation width ΔV due to the environmental conditions, the comparator CPM may compare the output voltage Vout±ΔV with the reference voltage Vref, and there is a possibility that the difference between the original output voltage Vout generated due to the process variations and the reference voltage Vref cannot be guaranteed. In such a case, it is difficult to generate the output data Dout intrinsic to the device.

In the present embodiment, the modulation voltage Vm is modulated to greatly change the output voltage Vout of the inverter IN forcefully, so that tough and highly reliable output data Dout intrinsic to the device can be obtained without being influenced by the environmental conditions. In an embodiment, if the variation width of the output voltage Vout caused by the environmental conditions is ΔV, the variation width Vx of the output voltage Vout of the inverter N caused by the variation of the modulation voltage Vm is, for example, greater than ΔV (Vx>ΔV). At this time, the reference voltage Vref of the comparator CMP may be changed dynamically to the voltage level corresponding to the variation value of the modulation voltage Vm or may be fixed as it is.

In the voltage dependent circuit shown in FIG. 3, the inverter IN is formed by the pull-up resistor and the NMOS transistor, but this is only an example. The inverter IN may also be a CMOS inverter that uses the modulation voltage Vm as power source. In addition, the comparator CMP may be replaced by a CMOS inverter that uses a fixed voltage Vf as power source, and furthermore, the fixed voltage Vf (of the CMOS inverter) may be changed to perform an operation equivalent to the comparator.

The data sampler 140 samples the output data Dout outputted from the PUF circuit 130 in response to the voltage modulation control signal Vc and holds it. The data sampler 140 accumulates at least one piece of the output data Dout and provides the sampled output data SDO1, SDO2 . . . SDOn (n is an integer equal to or greater than 1) to the PUF data output part 150.

The PUF data output part 150 receives the sampled output data SDO1, SDO2 . . . SDOn from the data sampler 140, generates the intrinsic data PUFout based on the received output data SDO1, SDO2 . . . SDOn, and outputs it. The PUF data output part 150 uses a predetermined or configurable logic function such as weighted majority logic, probability function, or EXOR, EXNOR or the like as the logic for generating the intrinsic data PUFout from a plurality of pieces of sampled output data SDO1, SDO2 . . . SDOn to convert the sampled output data into the intrinsic data PUFout. Needless to say, masking from external data or internal calculation is applied on a part of unstable PUFout.

Figure 4:
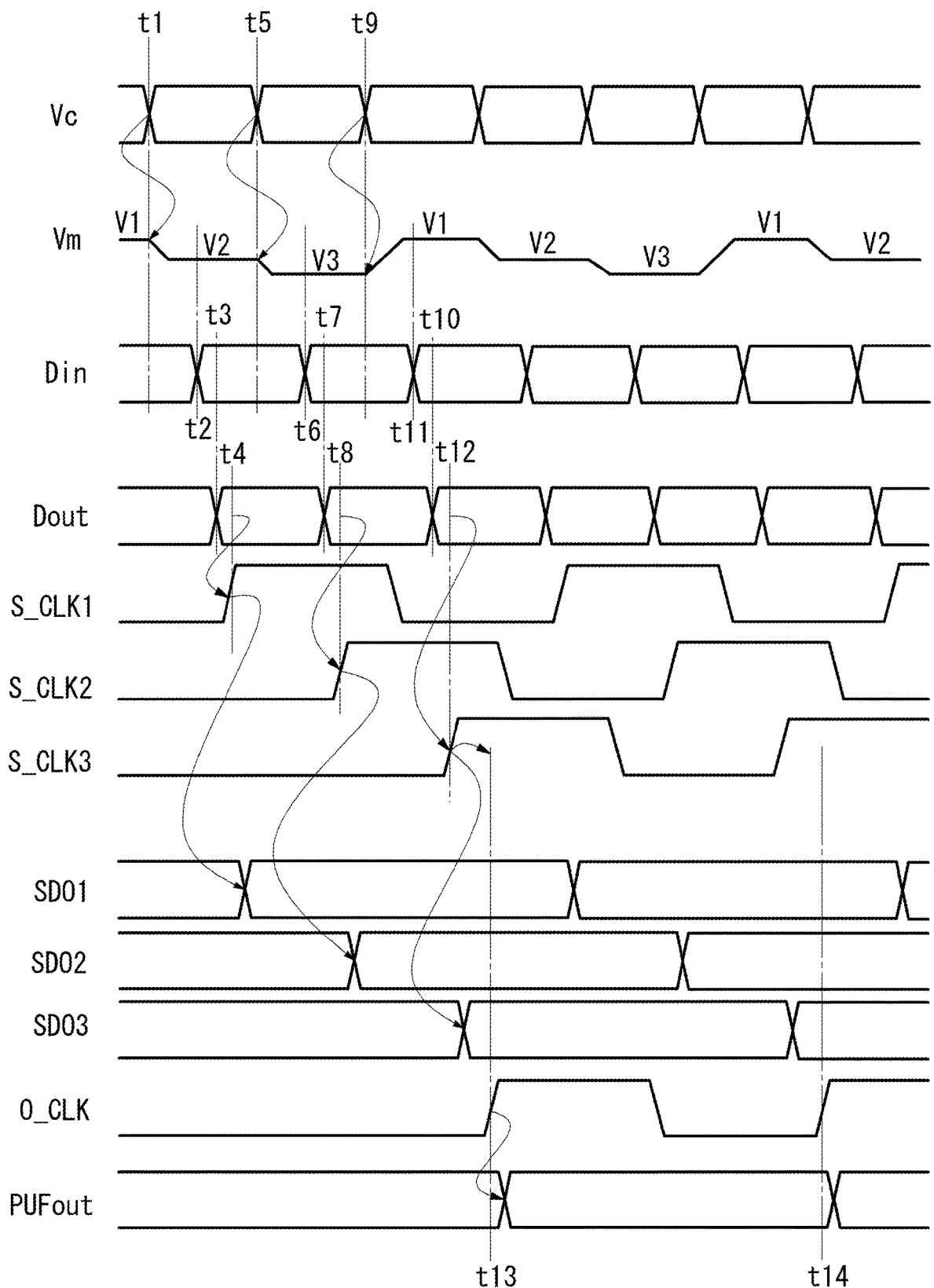
FIG. 4 is a diagram showing the operating waveform of each part of the PUF generation device according to an embodiment of the disclosure.

Next, the operation of the PUF generation device of the present embodiment will be described with reference to the operating waveforms of FIG. 4. In the example described below, the voltage modulation control part 110 outputs a clock signal as the voltage modulation control signal Vc, the modulation signal Vm changes with three voltage levels V1, V2 and V3, and the data sampler 140 provides three sampled output data SDO1, SDO2, and SDO3 to the PUF data output part 150.

The voltage modulation part 120 shifts the voltage level of the modulation signal Vm from V1 to V2 in response to the rising edge of the voltage modulation control signal Vc at the time t1. At the time t2, when the voltage level of the modulation signal Vm is stable, the input data Din shifts (from H to L or from L to H) so as to synchronize with the voltage modulation control signal Vc with a time delay. The processing of the PUF circuit 130 is performed, and after a certain time, the output data Dout is outputted from the PUF circuit 130 at the time t3.

The data sampler 140 samples the output data Dout in response to sample clock signals S_CLK1, S_CLK2, and S_CLK3 generated at a frequency of ⅓ of the voltage modulation control signal Vc and holds it. At the time t4, the data sampler 140 samples the output data Dout in response to the rising edge of the sample clock signal S_CLK1, and the sampled output data SDO1 is provided to the intrinsic data output part 150. The sampled output data SDO1 is the output data Dout outputted from the PUF circuit 130 when the voltage level is V2.

Next, at the time t5, the voltage level of the modulation signal Vm shifts from V2 to V3 in response to the rising edge of the next clock of the voltage modulation control signal Vc. At the time t6 which is delayed by a certain time after the time t5, the input data Din shifts, and the output data Dout is outputted from the PUF circuit 130 at the time t7. At the time t8, which comes after a certain time from the time t7, the output data Dout is sampled by the data sampler 140 in response to the rising edge of the sample clock signal S_CLK2 and held, and the sampled output data SDO2 is provided to the intrinsic data output part 150. The sampled output data SDO2 is the output data Dout outputted from the PUF circuit 130 when the voltage level is V3.

Next, at the time t9, the voltage level of the modulation signal Vm shifts from V3 to V1 in response to the rising edge of the next clock of the voltage modulation control signal Vc. At the time t10 which is delayed by a certain time after the time t9, the input data Din shifts, and the output data Dout is outputted from the PUF circuit 130 at the time t11. At the time t12, which comes after a certain time from the time t11, the output data Dout is sampled by the data sampler 140 in response to the rising edge of the sample clock signal S_CLK3 and held, and the sampled output data SDO3 is provided to the intrinsic data output part 150. The sampled output data SDO3 is the output data Dout outputted from the PUF circuit 130 when the voltage level is V1.

Next, the intrinsic data output part 150 outputs the intrinsic data PUFput based on the sampled output data SDO1, SDO2, and SDO3 in response to the rising edge of the output clock signal O_CLK. The output clock signal O_CLK has a frequency of ⅓ of the voltage modulation control signal Vc. Thereafter, similarly, the voltage level is modulated and accordingly the three sampled output data SDO1, SDO2, and SDO3 from the PUF circuit 130 are sampled by the data sampler 140, and at the next time t14, the intrinsic data PUFout is outputted based on the three sampled output data SDO1, SDO2, and SDO3.

According to the present embodiment, as described above, since the operating voltage of the PUF circuit 130 is modulated to absorb the influence of the environmental conditions (variation of the power source voltage and operating temperature), the stability and reliability of the intrinsic data PUFout are improved. Furthermore, by using a plurality of pieces of sampled output data SDO1, SDO2 . . . SDOn to generate the intrinsic data PUFout, the stability and reliability of the intrinsic data PUFout can be guaranteed.

The voltage modulation control signal Vc, the sample clock signals S_CLK1, S_CLK2, and S_CLK3, and the output clock signal O_CLK are used in the above embodiment, and these clock signals are generated, for example, by a timing generation circuit. For example, the timing generation circuit can generate the voltage modulation control signal Vc, the sample clock signals, and the output clock signal based on a reference clock signal. Any clock generation method may be used and is not particularly limited.

In the above embodiment, the voltage level is modulated in three stages, but this is only an example. The voltage level may also be modulated in two stages, four stages or more. In addition, although the above embodiment illustrates an example where the voltage modulation control signal Vc and the input data Din are associated, the input data Din may be a clock signal obtained by delaying the voltage modulation control signal Vc. In other words, the voltage modulation control signal Vc may be a part of the challenge input of the PUF circuit.

The above embodiment illustrates an example where the voltage level is modulated. Alternatively, the current level may be modulated or the trimming data of the circuit parameters may be modulated. In the case where the current level is modulated, the PUF circuit 130 includes a current dependent circuit, in which a relationship with randomness between input and output depends on the current level, and changes the current of the current dependent circuit in response to the modulation signal. Further, in the case where the trimming data is modulated, the PUF circuit 130 has a function of adjusting the operating voltage by the trimming data, for example, and may change the trimming data from the minimum to the maximum as the modulation signal and change the operating voltage. Alternatively, the circuit parameters of the PUF circuit 130 may be changed by the modulation signal.

The above embodiment illustrates an example where a plurality of inverters serve as the PUF circuit, but this is only an example. Other configurations may be adopted. For example, the PUF circuit may be composed of a resistance variable memory array including variable resistance elements.

Figure 5A:
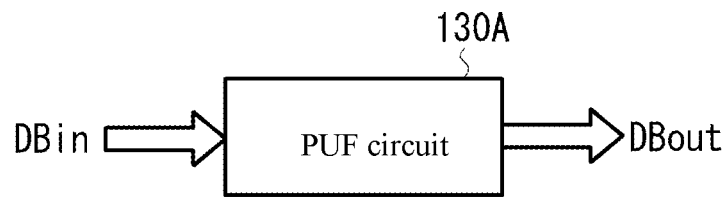
FIG. 5A and FIG. 5B are diagrams showing another example of the PUF circuit according to an embodiment of the disclosure.

Next, a modification example of the present embodiment will be described. In the above embodiment, the PUF circuit 130 outputs single-bit output data Dout In this modification example, as shown in FIG. 5A, the PUF circuit 130A receives multi-bit input data Din from the input bus DBin and outputs multi-bit output data Dout from the output bus DBout.

Figure 5B:
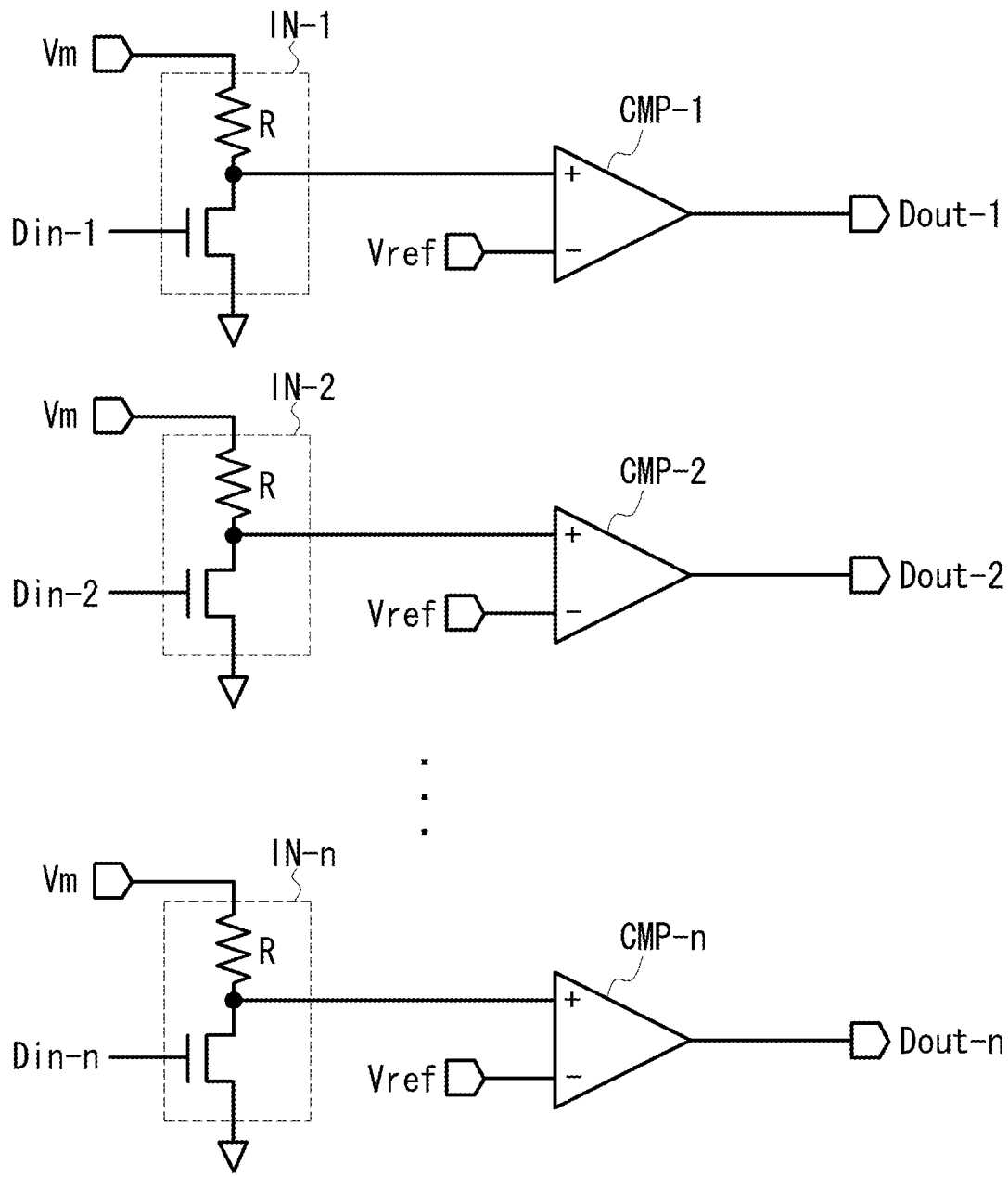

FIG. 5B shows the internal configuration of the PUF circuit 130A. n-bit input data Din is inputted to the PUF circuit 130A and n-bit output data Dout is outputted. That is, the input data Din-1 is inputted to the inverter IN-1, the input data Din-2 is inputted to the inverter IN-2, and the input data Din-n is inputted to the inverter IN-n. Part of the input data Din-1, Din-2 . . . Din-n may be different data or all of them may be the same data. In the case where the same input data is used, a data pattern obtained by delaying the data pattern of the voltage modulation control signal Vc is commonly inputted to the inverters IN-1, IN-2 . . . IN-n. In the case where different input data is used, for example, data obtained by inverting the data of the voltage modulation control signal Vc can be used.

The n-bit output data Dout, that is, the comparison results of the comparators CMP-1, CMP-2 . . . CMP-n, is supplied to the output bus DBout. The data sampler 140 samples the n-bit output data Dout at once and provides n-bit sampled output data SDO1, SDO2 . . . SDOn to the intrinsic data output part 150. The intrinsic data output part 150 generates the intrinsic data PUFout based on the n-bit sampled output data SDO1, SDO2 . . . SDOn and outputs it.

According to this modification example, since the PUF circuit 130A inputs a plurality of pieces of input data Din in parallel and outputs a plurality of pieces of output data Dout in parallel, the data sampler 140 can sample a plurality of pieces of output data at once, and the intrinsic data output part 150 can generate more stable and reliable intrinsic data from a large number of pieces of sampled output data.

Figure 6:
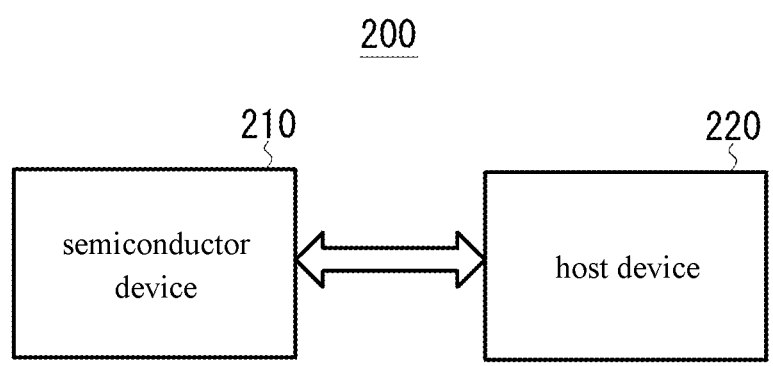
FIG. 6 is a diagram showing an example of the authentication system according to an embodiment of the disclosure.

FIG. 6 shows an example of an authentication system according to the present embodiment. The authentication system 200 includes a semiconductor device 210, which includes the PUF generation device of the present embodiment, and a host device 220. For example, the semiconductor device 210 and the host device 220 are connected by wired or wireless connection, and the host device 220 authenticates whether the semiconductor device 210 is authentic (whether it is fraudulent or not) using the intrinsic data outputted from the semiconductor device 210. In an example, the host device 220 can use the semiconductor device 210 only if the host device 220 can authenticate the semiconductor device 210, and cannot use the semiconductor device 210 if the host device 220 cannot authenticate the semiconductor device 210. The host device 220 is not particularly limited and is a device cooperating with the semiconductor device 210, including a computer device, a computer system, a microcontroller, a microcomputer, etc., for example.

The semiconductor device 210 uses a circuit or circuit element included therein to generate intrinsic information. For example, the semiconductor device 210 may include various circuits or circuit elements (for example, transistors, resistors, capacitors, etc.) for performing specific functions on a silicon substrate or other substrates (for example, SiC, GaAs, sapphire, etc.). Furthermore, the semiconductor device 210 includes the intrinsic data generation device 10 and the PUF generation device 100 as described in the above embodiment.

When the semiconductor device 210 is connected, the host device 220 receives intrinsic data from the semiconductor device 210 and authenticates the semiconductor device 210 based on the intrinsic data. The authentication may be performed at any timing. For example, the authentication may be performed when the semiconductor device 210 is connected for the first time or when the host device 220 receives a request from the user.

Although exemplary embodiments of the disclosure have been described in detail above, the disclosure is not limited to specific embodiments, and various modifications and changes may be made within the scope of the disclosure defined in the claims.

What is claimed is:

1. An intrinsic data generation device, comprising:
   a modulation circuit modulating a signal based on a modulation control signal that is for controlling modulation, and outputting a modulation signal that has been modulated;
   a PUF circuit comprising a voltage dependent circuit operated in the modulation signal, specifying a relationship between input data and output data of the voltage dependent circuit based on a random variation intrinsic to a device and changing the output data based on the modulation signal, wherein a variation magnitude of the output data based on the modulation signal is greater than a variation magnitude of the output data caused by environmental conditions; and
   an intrinsic data output circuit generating intrinsic data based on the output data outputted from the PUF circuit and outputting the intrinsic data that has been generated,
   wherein the modulation circuit modulates a voltage level based on the modulation control signal, and
   the PUF circuit changes the output data in response to modulation of the voltage level,
   wherein the modulation circuit modulates the voltage level in m stages, and
   m is an integer equal to or greater than 2,
   the PUF circuit outputs m pieces of output data in response to modulation of the voltage level in m stages and the intrinsic data output circuit converts the m pieces of output data into a piece of intrinsic data based on a predetermined logic.

2. The intrinsic data generation device according to claim 1, further comprising a modulation control circuit generating the modulation control signal,
   wherein the input data has a data pattern associated with a data pattern of the modulation control signal.

3. The intrinsic data generation device according to claim 2, wherein the data pattern of the modulation control signal is a clock signal.

4. The intrinsic data generation device according to claim 1, further comprising a holding circuit holding the output data outputted from the PUF circuit in response to the modulation control signal, wherein the holding circuit provides one or more pieces of output data to the intrinsic data output circuit.

5. The intrinsic data generation device according to claim 1, wherein the PUF circuit comprises an input bus inputting a plurality of pieces of input data and an output bus outputting a plurality of pieces of output data, and
   the intrinsic data output circuit generates the intrinsic data based on the plurality of pieces of output data outputted from the output bus.

6. The intrinsic data generation device according to claim 1, wherein the modulation circuit modulates a current level based on the modulation control signal, and
   the PUF circuit changes the output data in response to modulation of the current level.

7. The intrinsic data generation device according to claim 1, wherein the modulation circuit modulates trimming data based on the modulation control signal, and
   the PUF circuit changes the output data in response to modulation of the trimming data.

8. A semiconductor device, comprising:
   an intrinsic data generation device, comprising:
      a modulation circuit modulating a signal based on a modulation control signal that is for controlling modulation, and outputting a modulation signal that has been modulated;
      a PUF circuit specifying a relationship between input data and output data based on a random variation intrinsic to a device and changing the output data based on the modulation signal, wherein the random variation intrinsic to the device is relative to a plurality of process variations of the device; and
      an intrinsic data output circuit generating intrinsic data based on the output data outputted from the PUF circuit and outputting the intrinsic data that has been generated; and
   a specific circuit performing a specific function; and
   an external teitainal at least connected to the intrinsic data generation device respectively,
      wherein the external terminal outputs the intrinsic data to outside,
      wherein the modulation circuit modulates a voltage level based on the modulation control signal, and the PUF circuit changes the output data in response to modulation of the voltage level,
      wherein the modulation circuit modulates the voltage level in in stages, and in is an integer equal to or greater than 2, the PUF circuit outputs m pieces of output data in response to modulation of the voltage level in m stages.

9. An authentication system, comprising:
a semiconductor device, comprising:
an intrinsic data generation device, comprising:
a modulation circuit modulating a signal based on a modulation control signal that is for controlling modulation, and outputting a modulation signal that has been modulated;
a PUF circuit specifying a relationship between input data and output data based on a random variation intrinsic to a device and changing the output data based on the modulation signal, wherein the random variation intrinsic to the device is relative to a plurality of process variations of the device; and
an intrinsic data output circuit generating intrinsic data based on the output data outputted from the PUF circuit and outputting the intrinsic data that has been generated; and
a specific circuit performing a specific function; and
an external terminal at least connected to the intrinsic data generation device respectively; and
a host device connected to the semiconductor device,
wherein the host device authenticates the semiconductor device based on the intrinsic data outputted from the semiconductor device,
wherein the modulation circuit modulates a voltage level based on the modulation control signal, and the PUF circuit changes the output data in response to modulation of the voltage level,
wherein the modulation circuit modulates the voltage level in m stages, and m is an integer equal to or greater than 2, the PUF circuit outputs m pieces of output data in response to modulation of the voltage level in m stages.

* * * * *